United States Patent Office.

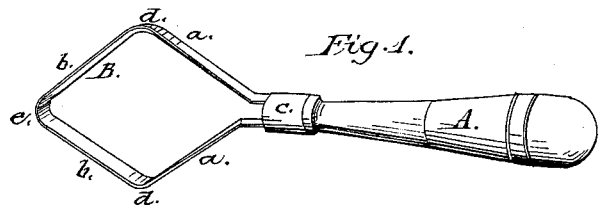
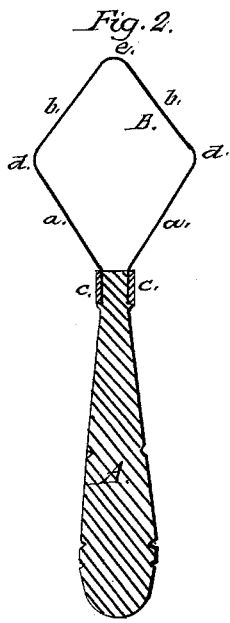
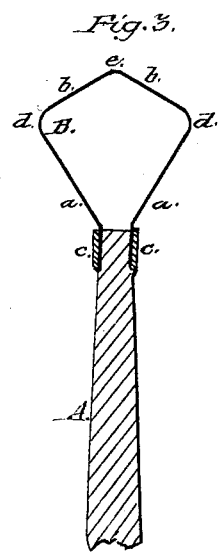

ARTHUR F. NOYES AND N. D. BEECROFT, OF BANGOR, MAINE.

Letters Patent No. 94,504, dated September 7, 1869.

IMPROVED HAND-WEEDER.

The Schedule referred to in these Letters Patent and making part of the same.

*To all whom it may concern:*

Be it known that we, ARTHUR F. NOYES and N. D. BEECROFT, of Bangor, in the county of Penobscot, and State of Maine, have invented a new and useful or improved Hand-Weeder; and we do hereby declare that the following, taken in connection with the drawings which accompany and form part of this specification, is a description of our invention, sufficient to enable those skilled in the art to which it appertains to practise it.

This invention relates to an implement to be used in exterminating the weeds growing among young plants, and also in pulverizing the soil around the roots of the plants at the same time that the weeds are destroyed; and It consists of a handle of suitable form and length, to be used either with one or both hands, in which is secured a peculiarly-formed blade, constructed of a single piece of steel or other metallic ribbon, of such outline as to facilitate working in close proximity to tender plants without injury to them, yet effectually eradicating the weeds and pulverizing the soil;

Figure 1 is a perspective view of our invention;

Figure 2 is a longitudinal section of the same;

Figure 3 is a longitudinal section, showing the weeder in a modified form; and

Figure 4 is a cross-section of the blade.

Similar letters of reference indicate corresponding parts in the several figures.

In the drawings—

A represents the handle, formed to be used in one hand.

B is the blade, formed of one piece of steel ribbon, of an elliptical cross-section, as shown in fig. 4.

The ends of this blade are inserted in handle A, as shown in figs. 2 and 3, and are held firmly in place by the ferrule c, as shown in the drawings.

The blade B diverges from handle A at a suitable angle, as shown at *a a*, until the requisite width is attained, when, by easy curves, *d d*, they are bent to a converging angle, as shown at *b b*, and at the apex the blade is also rounded to an easy curve, as shown at *i*. By thus forming the blade B with the four sides *a a* and *b b*, the curves *d d* are at a sufficient distance from the handle to allow their being brought in contact with the earth when inserting them in the spaces between the plants.

The sides *b b* are used in the more open spaces between the rows, and, by inserting the blade beneath the soil and moving it edgewise, the earth is pulverized and disturbed, while the weeds are effectually destroyed.

By forming the blade with curves at *d d* and *e*, instead of angles, the soil does not lodge therein, and the blade at these points is in better form for use, as described.

In fig. 3, the angles *b b* are depressed or flattened for convenience in using with a long handle, in a similar manner as the common hoe is used.

By forming the blade B of two-edged or elliptical steel, as shown in fig. 4, the implement is used in any position with equal facility, and a more effective garden-implement can thus be constructed than by any method heretofore employed.

It will be apparent that a great variety of forms of outline of blade B may be employed, such as forming it entirely with curves, avoiding angles or straight lines, or with straight lines and angles, as the nature of the uses to which it is applied may render expedient, the form shown in the drawings being that deemed best for general purposes; also, various ways of connecting the blade and handle may be employed, such as forming both of metal, and in one piece, or in various other ways, as may be found by experiment to be most expedient.

Having thus described our invention,

What we claim as new, and desire to secure by Letters Patent, is—

The hand-weeder, when constructed and arranged to operate, substantially as described and shown.

ARTHUR F. NOYES.
N. D. BEECROFT.

Witnesses:
ALBERT NOYES,
H. L. MITCHELL.